United States Patent [19]

Kuranaga

[11] Patent Number: 5,408,661
[45] Date of Patent: Apr. 18, 1995

[54] COMMUNICATION PROCESSOR
[75] Inventor: Hiroshi Kuranaga, Hyogo, Japan
[73] Assignee: Mitsubishi Denki Kabushiki Kaisha, Tokyo, Japan
[21] Appl. No.: 906,719
[22] Filed: Jun. 30, 1992
[30] Foreign Application Priority Data Oct. 2, 1991 [JP] Japan .................... 3-255102

[51] Int. Cl.6 ............................................. G06F 13/00
[52] U.S. Cl. ............................. 395/650; 364/DIG. 1; 364/284.4; 364/232.8
[58] Field of Search ............. 395/700; 370/85.1, 110.1; 364/DIG. 1 MS File

[56] References Cited

U.S. PATENT DOCUMENTS

| | | | |
|---|---|---|---|
| 4,430,699 | 2/1984 | Segarra et al. ................ | 364/DIG. 1 |
| 4,937,825 | 6/1990 | Ballard et al. ................ | 364/DIG. 1 |
| 4,991,133 | 2/1991 | Davis et al. .................. | 364/DIG. 2 |
| 5,003,470 | 3/1991 | Carpenter et al. ............ | 364/DIG. 1 |
| 5,007,051 | 4/1991 | Dolkas et al. ................ | 370/85.1 |
| 5,136,716 | 8/1992 | Harvey et al. ................ | 364/DIG. 1 |
| 5,184,348 | 2/1993 | Abdelmouttalib et al. .... | 370/110.1 X |
| 5,187,708 | 2/1993 | Nakatani et al. .............. | 370/85.1 |
| 5,289,469 | 2/1994 | Tanaka ......................... | 370/85.4 X |

Primary Examiner—Thomas M. Heckler
Attorney, Agent, or Firm—Lowe, Price, LeBlanc & Becker

[57] ABSTRACT

Data received from a first layer is processed in a communication processor. Memory controller determines whether or not an instruction to be processed next by a processing circuit is stored in an internal RAM. When it is stored, it reads the instruction from internal RAM, and otherwise, it reads an instruction from an external ROM through an DMAC. Processing circuit changes setting of register values in respective registers in memory controller to values of the corresponding layer, when processing for one layer is completed. Consequently, the layer to be processed by the communication processor is switched.

8 Claims, 9 Drawing Sheets

COMMUNICATION PROCESSOR

BACKGROUND OF THE INVENTION

1. Field of the Invention

The present invention relates to a communication processor and, more specifically, to a one chip communication processor for carrying out protocol processing of a plurality of layers in a hierarchical network system in which communication functions are provided in a plurality of hierarchical layers.

2. Description of the Background Art

OSI (Open Systems Interconnection) represents international standard of a network architecture, the standard of which is now being developed mainly by ISO (International Organization for Standardization). The object of OSI is to enable free exchange of data among terminals and computers of different types.

In order to enable mutual communication of arbitrary application processes in a computer network, rules with respect to data transfer via repeater open system, conversation between application processes, access to various resources (files and the like) and so on must be defined as protocols, based on data transfer between open systems directly coupled by means of physical medium. Further, it is necessary to make these protocols available by appropriately combining the same in accordance with field of application and structures of the computer network.

Therefore, in a basic reference model of the OSI, communication functions of the open system including function of controlling communication circuits and a series of communication processing functions (encryption, code conversion, display control, file transfer.accessing, data base accessing and the like) are divided into seven functional hierarchical layers which operate in order corresponding to processes of communication (see FIG. 6). Necessary protocols are determined for every stage of the functional hierarchy so as to realize the function allotted to that layer. This is the concept of protocol hierarchy, and each functional layer is called as a protocol layer or, simply, a layer.

By this protocol hierarchy, a protocol for realizing the communication function allotted to each layer can be closed in that layer, thereby maximizing independency of the protocol in respective layers. Consequently, influence of introduction of new technology, influence derived from expansion.modification of communication functions incidental to newly generated needs of users can be limited to layers which are directly related. Therefore, maintainability of protocols and protocol products can be improved. Each layer may be divided into sub layers, as needed.

Seven layers shown in FIG. 6 will be briefly described.

(1) Physical Layer (first layer)

Various physical media such as communication satellites and optical fibers are used for data transmission. The physical layer provides function of transmitting "bit strings" through such physical media. More specifically, physical conditions, electrical conditions and the like necessary for bit transmission are defined.

(2) Data Link Layer (second layer)

By using bit transmitting function of the physical layer, transparent and highly reliable data transmission is carried out between adjacent systems (nodes). This layer corresponds to a conventional high level transmission control procedure (HDLC) and it includes data transmission error control procedure and the like.

(3) Network Layer (third layer)

Exchange of data between systems at both ends is enabled through various communication nets such as public packet switching network. For this purpose, a routing function for designating communication path to transmitting data to the destination and function of passing data (data relay function) among nodes are necessary.

(4) Transport Layer (fourth layer)

Transparent and highly reliable data transfer is carried out between processes of systems at both ends. If quality of services provided by the lower network layer does not satisfy the service quality (for example, rate of data transmission error) required by the application, the transport layer compensates for the lack of service.

(5) Session Layer (fifth layer)

In order to realize efficient conversation between application processes at both ends, this layer provides synchronization, selection of transmission mode and controls priority of transmission.

(6) Presentation Layer (sixth layer)

This layer controls forms of data and the like so that data treated by the application process can be accurately and efficiently transferred.

(7) Application Layer (seventh layer)

In this layer, application service elements such as file transfer, access and management (FTAM), message handling processing system (MHS), virtual terminal (VT) and remote data base access (RDA) are carried out corresponding to various applications executed by the user.

Integrated Services Digital Network (hereinafter referred to as ISDN) is known as one of the data networks employing the seven layered model of OSI described above. ISDN digitally integrates transmission paths and switching devices so as to provide, in united manner, various communication services such as telephone, data and images. In the conventional communication system prior to the ISDN, an interface between a terminal equipment of a user and a communication network is adapted to a fixed use such as for telephone or for data communication. However, in the ISDN, an integrated interface for the above mentioned various services is defined. This interface is referred to as general purpose user net interface, which is definitely defined by International Telegraph and Telephone Consultative Committee (hereinafter referred to as CCITT).

An application example of the ISDN is shown in FIG. 7. Referring to FIG. 7, in the ISDN, an ISDN switching device 18 provided in telephone exchange is connected to an ISDN terminal (TE) of a user by a telephone line 28. A network terminal (NT) 100 is provided at the user's residence, and telephone line 28 and four-wire bus 19 are connected thereto. Each ISDN terminal is connected through the four-wire bus 19 to the network terminal 100. A transmitting/receiving apparatus 27 for transmitting and receiving data signals through four-wire bus 19 is provided as an interface circuit at an input/output portion of each of the network terminal 100 and ISDN terminal.

FIG. 8 is a schematic block diagram of a telephone 20 as an example of the ISDN terminal. Referring to FIG. 8, the telephone 20 includes a transmitting/receiving apparatus 27 connected through a transformer 29 for signal transmission/reception to four-wire bus 19; a second layer processing apparatus 22 for realizing the functions of the second layer of the ISDN basic interface; a third layer processing apparatus 23 for realizing the functions of the third layer of the ISDN basic interface; a key pad 24; a CODEC (coder decoder) apparatus 25 for coding/decoding audio signals; a handset 26; and a switch 30.

The transmitting/receiving apparatus 27 is provided for realizing the function of the first layer of the ISDN basic interface. The four-wire bus 19 includes a transmission bus 19a for transmitting signals from telephone 20, and a receiving bus 19b for transmitting signals applied to telephone 20.

At call incoming, the reception signal transmitted through the receiving bus 19b is received by the transmitting/receiving apparatus 27 through transformer 29. The received signal is subjected to processing such as error detection in the second layer processing apparatus 22, and then it is applied to third layer processing apparatus 23. Third layer processing apparatus 23 identifies the telephone number and the contents of the requested service. While telephone 20 is being called, the third layer processing apparatus 23 turns on switch 30 to provide a communication path between transmitting/receiving apparatus 27 and CODEC apparatus 25. Consequently, CODEC apparatus 25 receives the signal which has been received by the transmitting/receiving apparatus 27, converts the same to an audio signal, and applies the converted audio signal to handset 26.

In calling, necessary information such as telephone number is applied through key pad 24 to the third layer processing apparatus 23. Third layer processing apparatus 23 converts the given information to data of a prescribed format and applies the same to second layer processing apparatus 22. Second layer processing apparatus 22 adds information such as error correction to the applied data, and transmits the data to transmitting/receiving apparatus 27. Transmitting/receiving apparatus 27 provides the applied data to transmission bus 19a through transformer 29. When a communication permission signal is returned from the other party in response to the transmitted data from telephone 20, the permission signal is received through transformer 29 by transmitting/receiving apparatus 27. The received signal is subjected to processings such as error correction by second layer processing apparatus 22, and then it is applied to third layer processing apparatus 23. Third layer processing apparatus 23 recognizes the communication permission signal, and turns on switch 30. Thus a communication path is established between transmitting/receiving apparatus 27 and CODEC apparatus 25. The audio signal generated from handset 26 is converted to a digital audio signal by means of CODEC apparatus 25. The converted digital audio signal is applied to transmitting/receiving apparatus 27 through switch 30. Transmitting/receiving apparatus 27 supplies the converted digital audio signal to transmission bus 19a through transformer 29, as a transmission signal.

FIG. 9 is a block diagram showing more detailed structure of second layer processing apparatus 22 and third layer processing apparatus 23 shown in FIG. 8. The second layer processing apparatus 22 includes a communication data converter 1; an FIFO (First-In First-Out) 2 for data reception; an FIFO 3 for data transmission; an internal bus 4; a signal line 5 connecting communication data converter 1 with transmitting/receiving apparatus 27 (see FIG. 8); a processing circuit 6 formed of, for example, a CPU; a DAMC (Direct Memory Access Controller) 7; a bus interface 8; and a ROM 9 storing instructions for the second layer protocol processing. Generally, second layer processing apparatus 22 is formed by one chip. Meanwhile, third layer processing apparatus 23 includes a ROM 10 storing instructions for third layer protocol processing; and a microprocessor 12 for carrying out the protocol processing of the third layer. Since ROM 10 has larger storage capacity than ROM 9, ROM 10 is generally mounted on a chip different from microprocessor 12. Second layer processing apparatus 22 and third layer processing apparatus 23 are connected to a system bus 13 so that data can be transmitted to and from each other. An external RAM 11 is further connected to system bus 13.

The operation of the conventional apparatus shown in FIG. 9 will be described. In second layer processing apparatus 22, a signal received from first layer processing apparatus (transmitting/receiving apparatus 27) through signal line 5 is input to communication data converter 1. Communication data converter 1 carries out flag detection, zero deletion, and frame error detection. An output data from communication data converter 1 is stored in the FIFO 2 for reception. Processing circuit 6 successively takes out data stored in FIFO 2 for reception, and carries out protocol processing of the second layer in accordance with instructions read from ROM 9. Remaining data related to the third and upper layers are transmitted to external RAM 11 through bus interface 8 and system bus 13 under control of DMAC 7. Microprocessor 12 in third layer processing apparatus 23 successively takes out data stored in external RAM 11, and carries out protocol processing of the third layer in accordance with instructions read from ROM 10.

The conventional communication processing apparatus is structured as described above. A dedicated processing apparatus (for example, transmitting/receiving apparatus 27, the second layer processing apparatus 22 and third layer processing apparatus 23 of FIG. 8) is provided for each of the layers. However, the processing apparatuses of the respective layers do not always operate constantly from the start to the end of the communication. For example, at the start of communication when link connection is established by the second layer processing apparatus, the third layer processing apparatus does not operate, since processing in the third layer takes place after the end of processing in the second layer. Therefore, hardware of processing apparatuses of respective layers was not effectively used in the conventional communication processing apparatus.

In the conventional communication apparatus, an external memory device (for example, external RAM 11 provided between second layer processing apparatus 22 and third layer processing apparatus 23 of FIG. 9) was necessary for exchange of data between two adjacent layers. Such external memory devices are provided between respective layers, increasing memory capacity of the whole system.

In addition, in the conventional communication processing apparatus, data transmission path (for example system bus 13 of FIG. 9) between respective layers must be frequently used because of data communication between respective layers.

SUMMARY OF THE INVENTION

An object of the present invention is to provide a communication processor capable of reducing frequency of use of the system buses, hardware amount and capacity of memory devices, in executing protocol processing of two or more layers.

The communication processor of the present invention includes receiving means, transmitting means, memory means and processing means. The receiving means receives external data. Transmitting means transmits data externally. Memory means stores some or all of instruction groups necessary for protocol processing of a plurality of layers. Processing means carries out protocol processing of the plurality of layers in accordance with the instructions read from the memory means.

In the present invention, protocol processing of a plurality of layers can be carried by one chip communication processor. Therefore, compared with the conventional one in which processing hardware is provided for each layer, the amount of hardware can be significantly reduced. In addition, since some or all of the instruction groups necessary for protocol processing of a plurality of layers are stored in the memory means provided on the chip of the communication processor, the speed of accessing is increased, and the frequency of use of the system bus can be decreased. In addition, the external memory device for data exchange between layers can be dispensed of, which reduces the cost of the whole apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
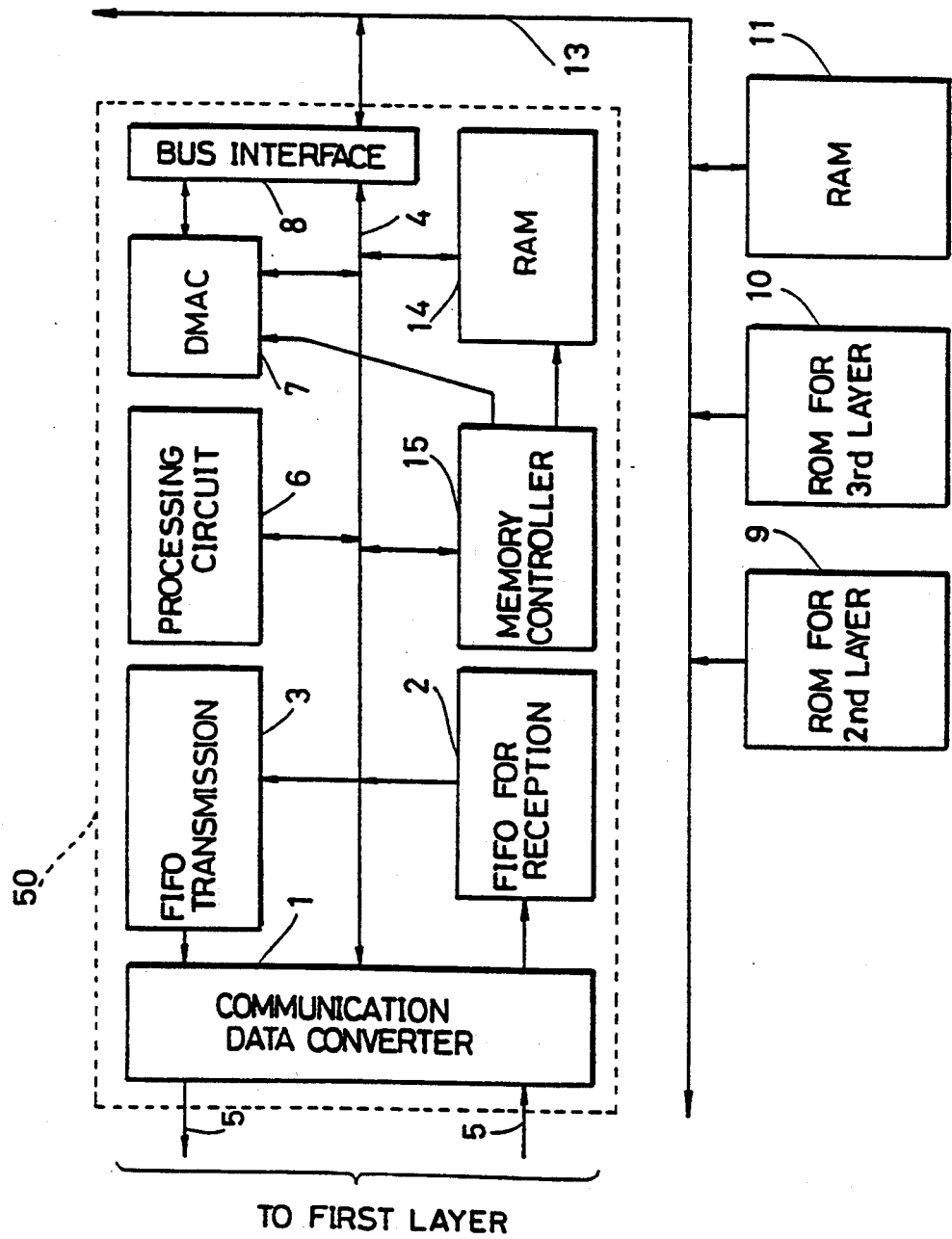
FIG. 1 is a block diagram showing a structure of one embodiment of the present invention.
Figure 9:
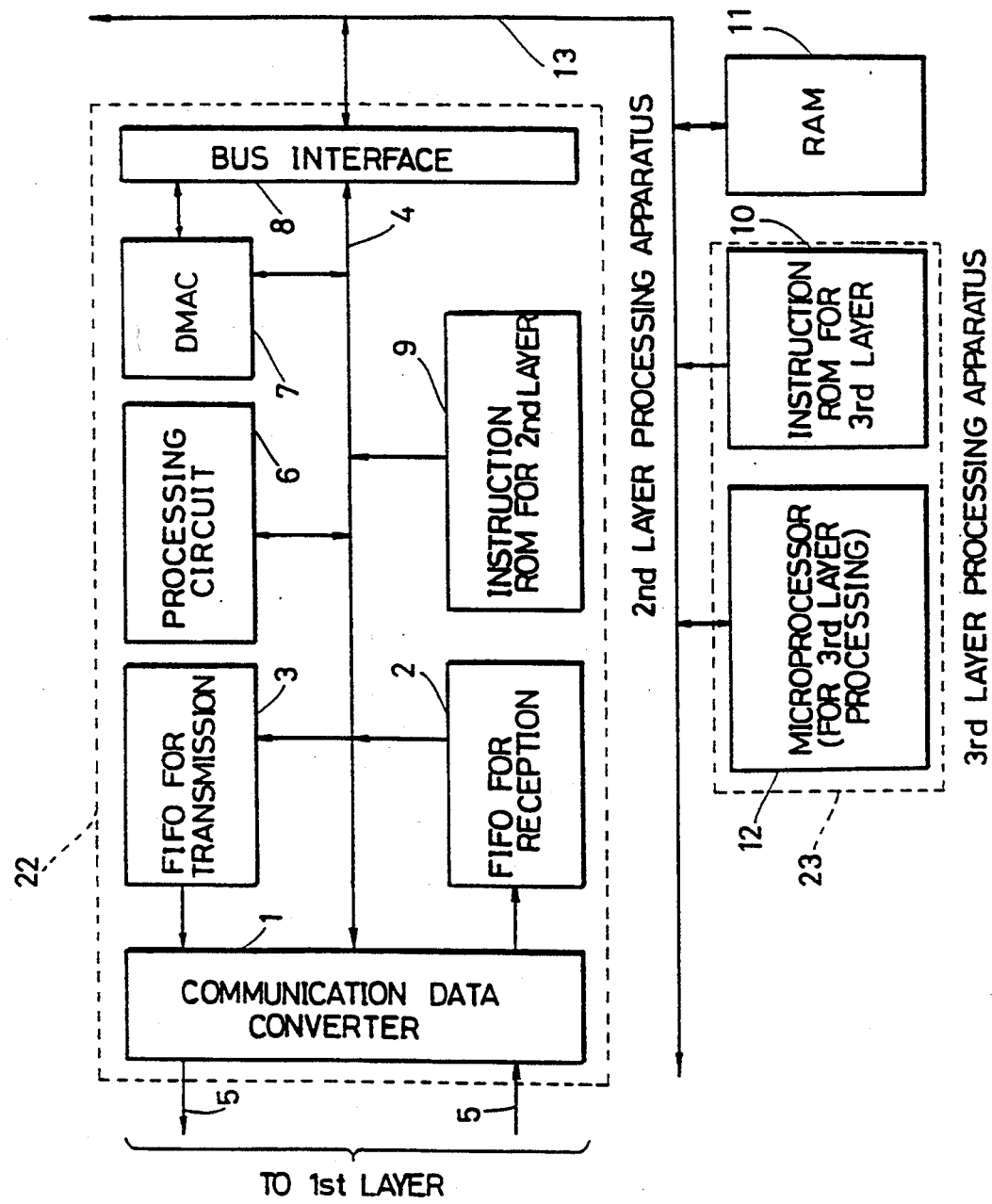
FIG. 9 is a block diagram showing a structure of a conventional communication processing apparatus.

FIG. 1 is a block diagram showing a structure of one embodiment of the present invention. A one chip communication processor 50 includes, similar to second layer processing apparatus 22 of FIG. 9, a communication data converter 1, an FIFO 2 for reception, an FIFO 3 for transmission, an internal bus 4, a signal line 5, a processing circuit 6, a DMAC 7 and a bus interface 8. Communication processor 50 further includes a processing circuit 6, an internal RAM 14 storing data for memory controller 15, and a memory controller 15 controlling the internal RAM 14. Outside the communication processor 50, and external ROM 9 storing protocol processing program for the second layer and register values for memory controller 15, an external ROM 10 storing protocol processing program for the third layer and register values for memory controller 15, and an external RAM 11 for exchanging data between communication processor 50 and an external apparatus (for example, processing apparatuses of the fourth and following layers) are provided. Communication processor 50, external ROMs 9 and 10 and external RAM 11 are mutually connected through a system bus 13. Communication processor 50 shown in FIG. 1 is structured to execute processing in the second and the third layers. Therefore, processing of the fourth and succeeding layers are carried out by other communication processors. However, processing of the fourth and succeeding layers can be carried out by one chip communication processor.

Figure 2:
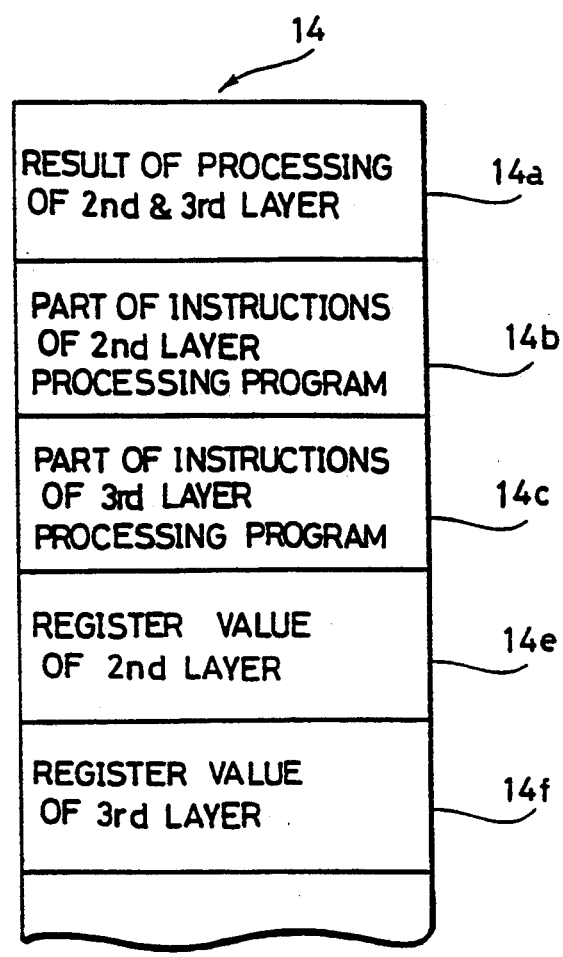
FIG. 2 is a schematic diagram showing a memory region of an internal RAM 14 of FIG. 1.

FIG. 2 is a schematic diagram showing a memory region of the internal RAM 14 shown in FIG. 1. The internal RAM 14 includes areas 14a to 14f as shown in the figure. Area 14a stores results of processing of the second and the third layers processed by processing circuit 6. Area 14b stores some repeatedly used instructions out of a plurality of instructions constituting the protocol processing program (stored in external ROM 9) of the second layer. Area 14c stores some repeatedly used instructions out of a plurality of instructions constituting protocol processing program of the third layer (stored in external ROM 10). Area 14e stores register values which are to be set in respective registers of memory controller 15 for the processing of the second layer. Area 14f stores register values which are to be set in respective registers of memory controller 15 for the processing of the third layer.

Figure 3:
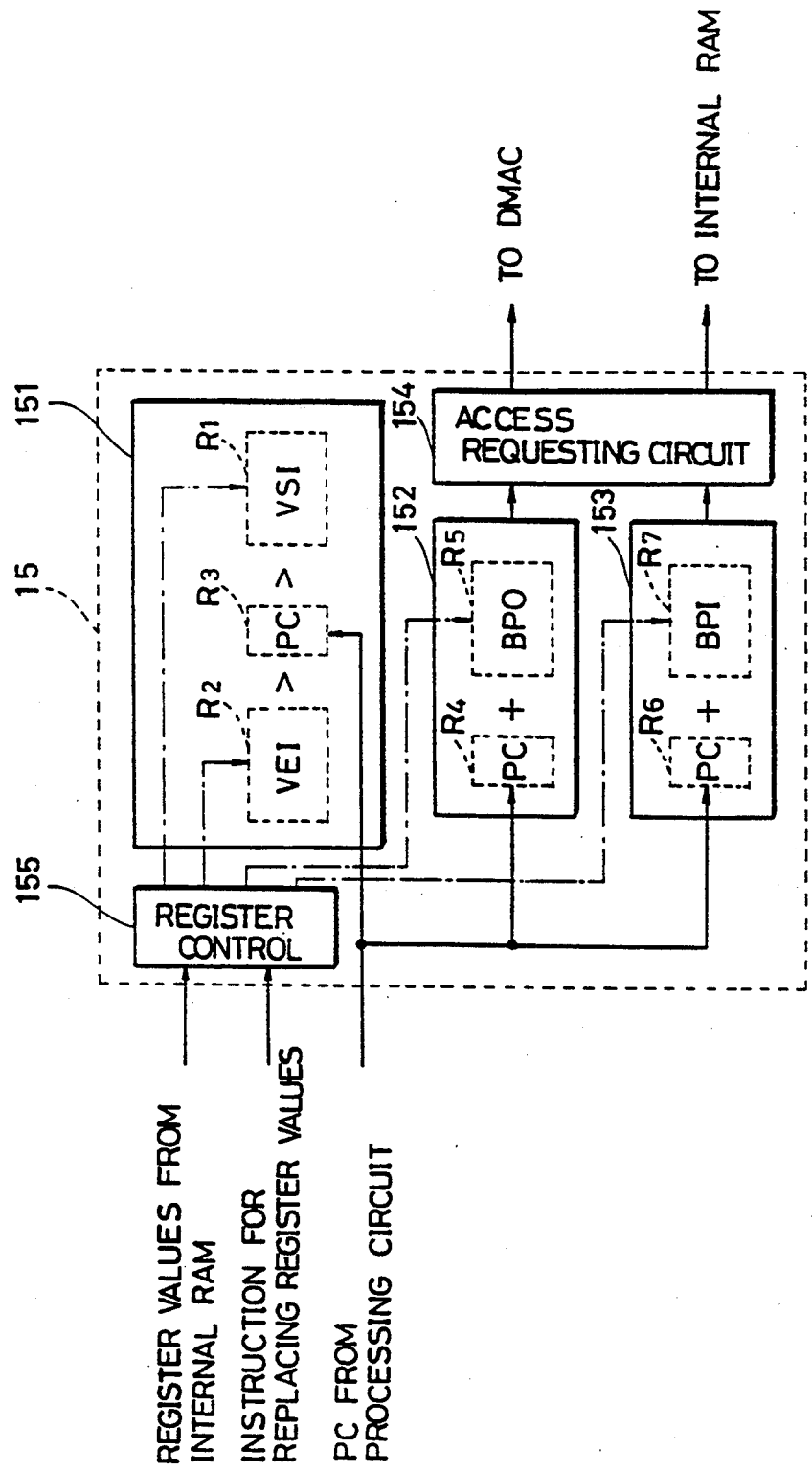
FIG. 3 is a block diagram showing one example of a structure of a memory controller 15 shown in FIG. 1.

FIG. 3 is a block diagram showing one example of the structure of memory controller 15 in FIG. 1. Referring to the figure, memory controller 15 includes an address determining circuit 151, adder circuits 152 and 153, an access requesting circuit 154 and a register control circuit 155. Address determining circuit 151 includes registers R1 to R3. Adder circuit 152 includes registers R4 and R5. Adder circuit 153 includes registers R6 and R7. Register values PC applied from processing circuit 6 are set in registers R3, R4 and R6. Register control circuit 155 sets register values VSI, VEI, BPO and BPI read from area 14e or 14f of internal RAM 14 in registers R1, R2, R5 and R7, respectively. Register control circuit 155 also changes, in response to an instruction for replacing register values applied from processing circuit 6, the register values set in respective registers R1, R2, R5 and R7 from those for the second layer to those for the third layer, or from those for the third layer to those for the second layer.

The register values set in respective registers R1 to R7 will be described. The register value PC is the value of a program counter (contained in processing circuit 6) indicating an address of an instruction to be processed next by processing circuit 6. This value PC is a virtual address value starting from 0 determined for each program corresponding to a layer or a sub layer so as to facilitate preparation of the program. Register values VSI and VEI are minimum and maximum values respectively of the virtual addresses corresponding to an instruction set residing in area 14b or 14c of the internal RAM 14. Register value BPI is an address conversion constant for converting the virtual address to a real address of the internal RAM 14. The register value BPI is provided by subtracting the minimum value VSI of the virtual address from the minimum value of the real address of the instruction set residing in area 14b or 14c of the internal RAM 14. The register value BPO is an address conversion constant for converting the virtual address to a real address of external ROM 9 or 10.

Address determining circuit 151 determines whether register value PC is between the register values VSI and VEI, that is, whether the instruction which is to be executed next by processing circuit 6 is stored in area 14b or 14c of the internal RAM 14. Adder circuit 152 adds register value PC to register value BPO so as to convert virtual address PC to a real address of external ROM 9 or 10. Adder circuit 153 adds register value PC to register value BPI to convert virtual address PC to a real address of internal RAM 14. Access requesting circuit 154 operates in response to the result of determination by address determining circuit 151. More specifically, if it is determined by address determining circuit 151 that the next instruction is stored in internal RAM 14, the access requesting circuit 154 supplies the real address in internal RAM 14 which is the result provided by address circuit 153 to internal RAM 14, so as to request a fetch of the instruction. If it is determined by address determining circuit 151 that the next instruction is not stored in internal RAM 14, access requesting circuit 154 supplies the real address of the external ROM 9 or 10 which is the result of addition by adder circuit 152 to DMAC 7, so as to request a fetch of the instruction to external ROM 9 or 10.

Figure 8:
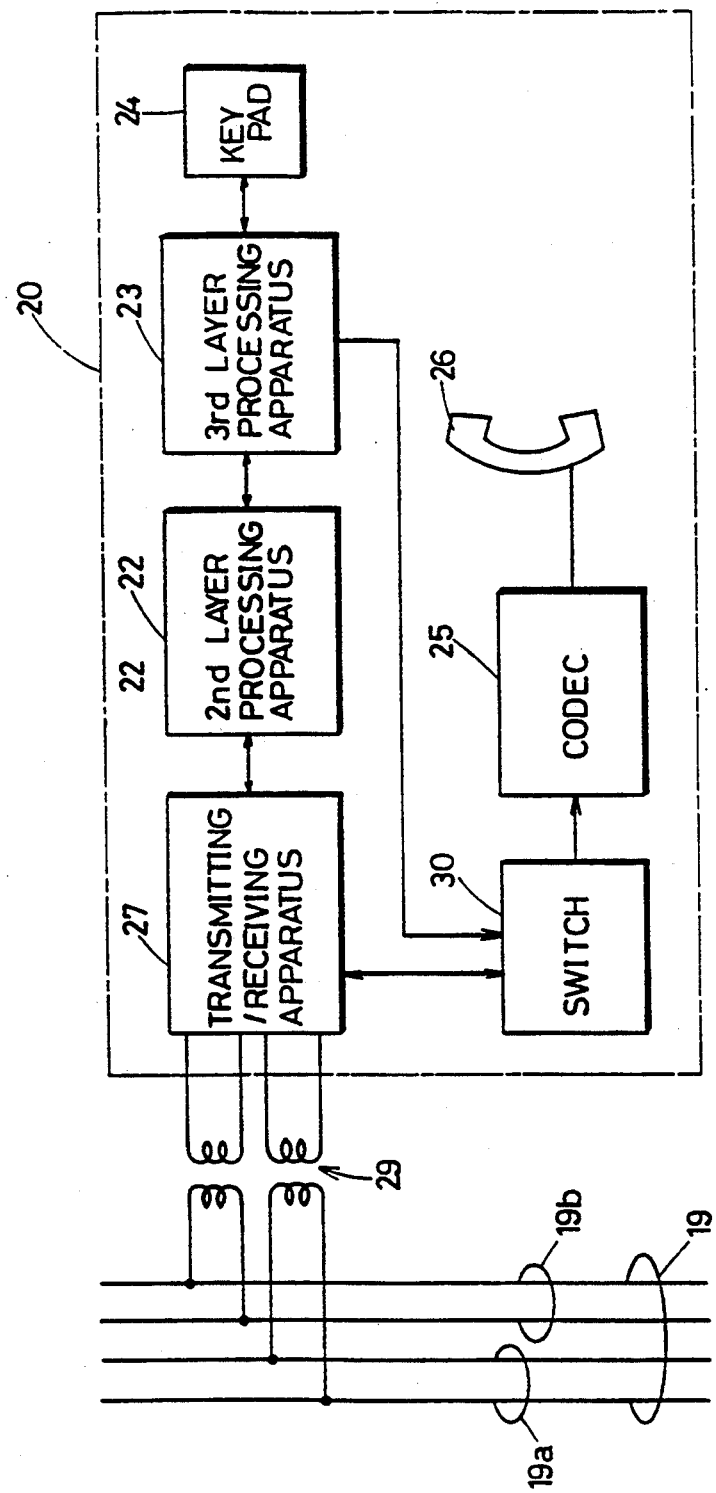
FIG. 8 is a block diagram of a telephone shown in FIG. 7.

The operation of the embodiment shown in FIG. 1 will be described. At first, in response to power on of the system, part of the protocol processing program of the second and third layers are read from external ROMs 9 and 10, to be stored in areas 14b and 14c of internal RAM 14, respectively. Register values for the second and third layers are read from external ROMs 9 and 10 to be stored in areas 14e and 14f of internal RAM 14, respectively. Data received through communication line 4 from layer processing apparatus (for example, transmitting/receiving apparatus 27 of FIG. 8) are subjected to flag detection, zero deletion, frame error detection and so on in communication data converter 1, and then it is stored in FIFO 2 for reception. Processing circuit 6 takes out data stored in FIFO 2 for reception, and requests which of the instruction for the second layer protocol processing to memory controller 15. More specifically, processing circuit 6 sets count value PC of a program counter (not shown) provided therein in registers R3, R4 and R6 of memory controller 15, and applies a second layer processing request to register control circuit 155. In response, register control circuit 155 reads respective register values from area 14e of internal RAM 14 and rewrites the contents of registers R1, R2, R5 and R7 by the read register value, that is, the value corresponding to the second layer, when the value set in respective registers R1, R2, R5 and R7 do not correspond to the second layer. Thereafter, address determining circuit 151 of memory controller 15 determines whether the instruction requested by processing circuit 6 exists in internal RAM 14. If it exists, it requests reading of the instruction to internal RAM 14. Otherwise, it request reading of the instruction to external ROM 9 through DMAC 7. The instruction read from internal RAM 14 or external ROM 9 is taken in processing circuit 6, and processing corresponding to the instruction is executed in the processing circuit 6.

The result of processing by the processing circuit 6 (the result of processing in accordance with the instruction read from the internal RAM and from external ROM 9) is stored in area 14a of internal RAM 14. When the second layer protocol processing corresponding to the received data is completed by repeating the above described series of operations, the processing circuit 6 rewrites register values in registers R1, R2, R5 and R7 of memory controller 15 by register values stored in area 14f of internal RAM 14, that is, values corresponding to the third layer. Then, protocol processing of the third layer is carried out on the data stored in area 14a of internal RAM 14. At this time, processing circuit 6 reads instructions from area 14c of internal RAM 14 or from external ROM 10, and executes these instructions. The result of processing by the processing circuit 6 is stored in area 14a of internal RAM 14. When the third layer protocol processing is completed, the result of processing stored in area 14a of internal RAM 14 is transferred through system bus 13 to external RAM 11.

Figure 4:
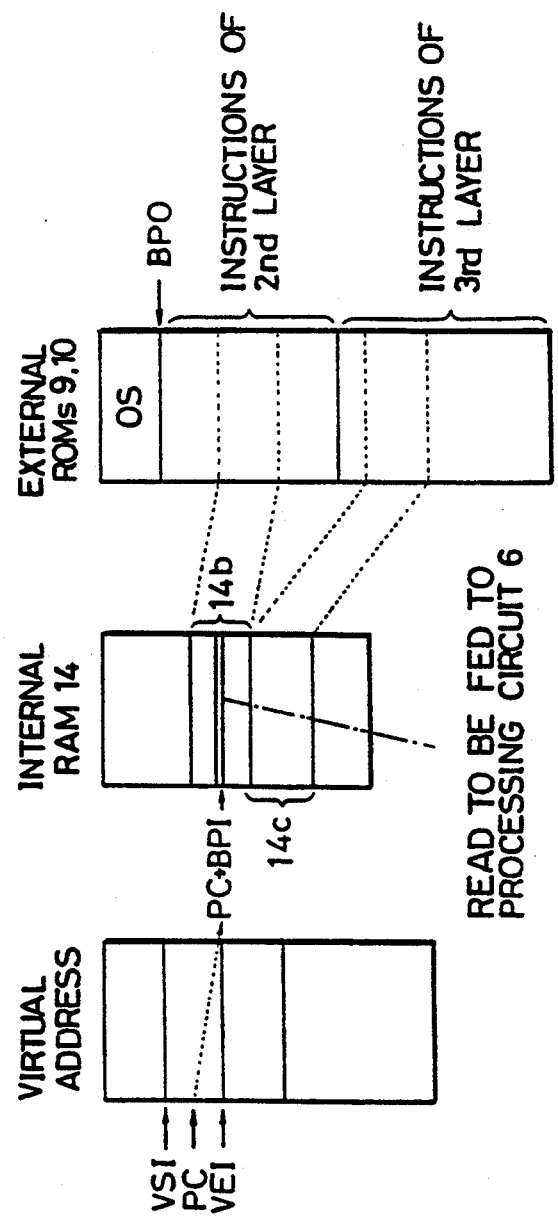
FIG. 4 is a schematic diagram showing relation between real addresses and virtual addresses in the RAM 14 and between addresses of the external ROM of FIG. 1.
Figure 5:
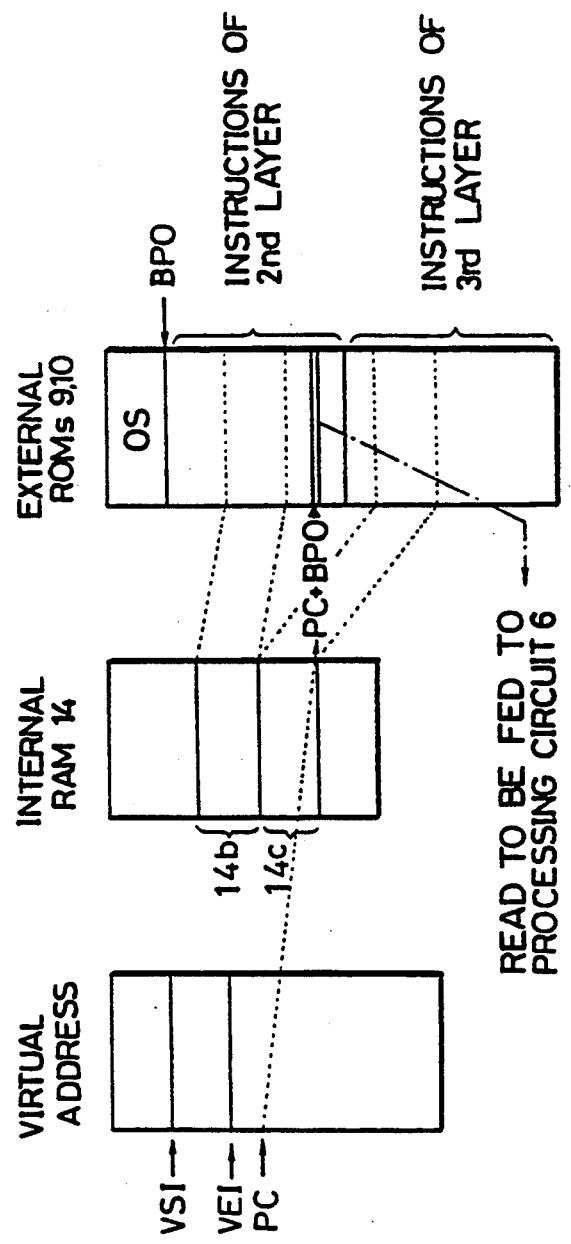
FIG. 5 is a schematic diagram showing relations between real addresses and virtual addresses of the RAM 14 and the addresses of the external ROM shown in FIG. 1.
Figure 6:
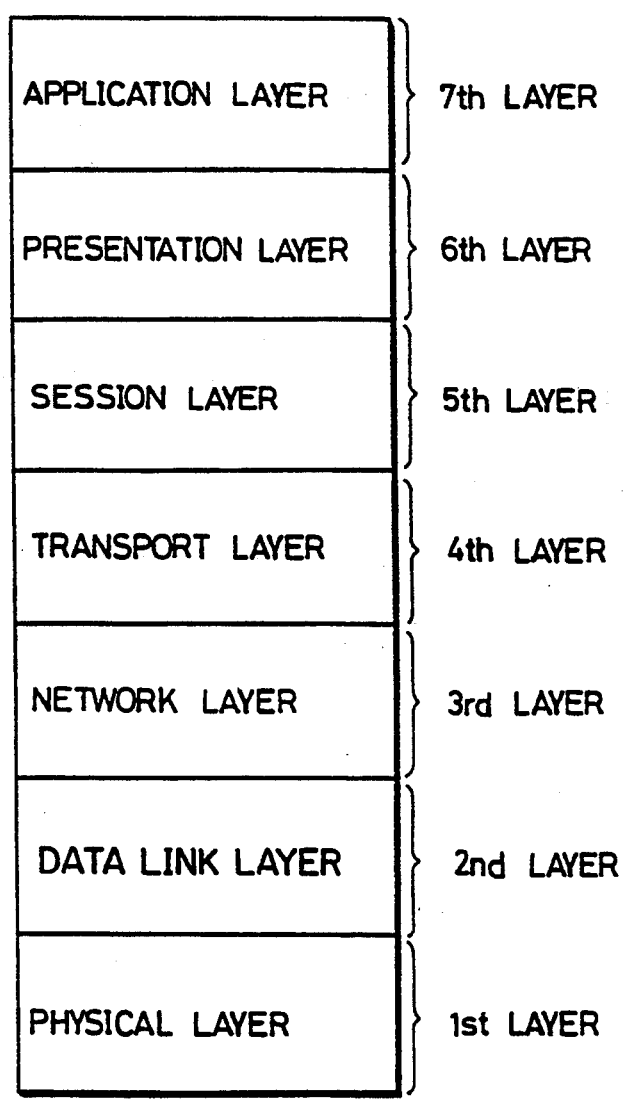
FIG. 6 is a schematic diagram showing a hierarchy of the protocols defined by OSI.
Figure 7:
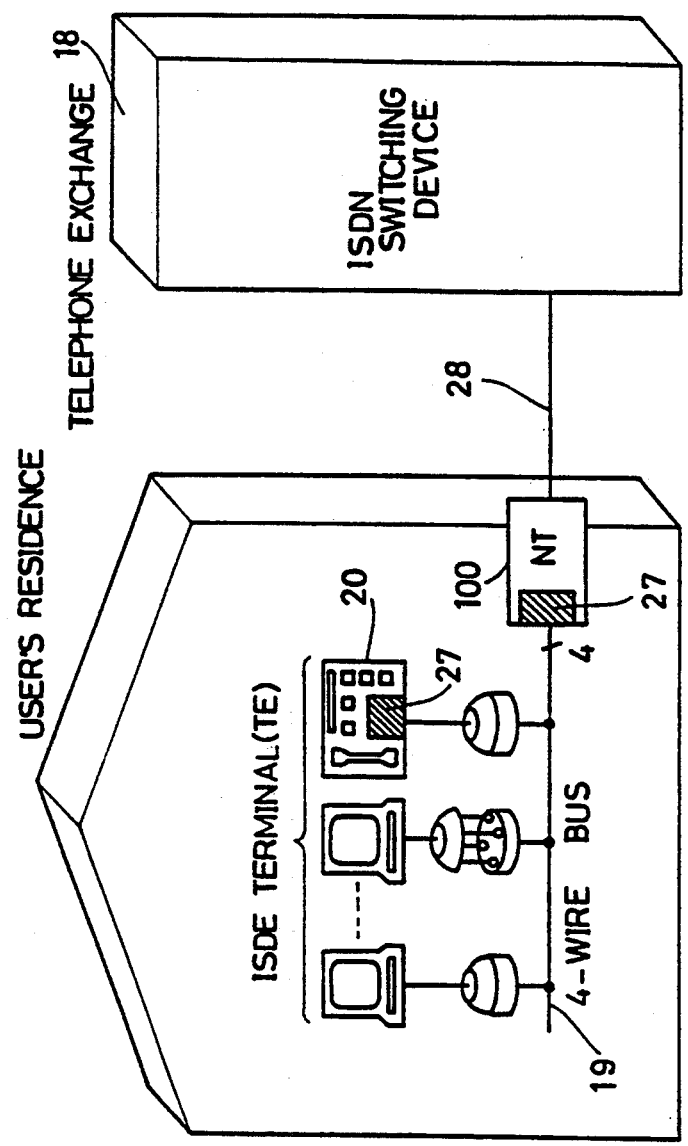
FIG. 7 shows an ideal of integrated services digital network (ISDN).

FIGS. 4 and 5 are schematic diagrams showing correspondence of addresses of internal RAM 14, external ROMs 9 and 10 or OS (Operating System). FIG. 4 shows a case in which an instruction designated by a virtual address PC is stored in internal RAM 14. FIG. 5 shows a case in which the instruction designated by virtual address PC is not stored in internal RAM 14 and external ROM 9 or 10 is accessed. The operation of the embodiment shown in FIG. 1 will be described in detail with reference to FIGS. 4 and 5.

Memory controller 15 determines, when it receives the virtual address PC of the instruction which is to be executed next from processing circuit 6, whether the virtual address PC exists between the register values VSI and VEI in address determining circuit 151. More specifically, it determines whether or not the instruction requested by processing circuit 6 exists in the instruction set residing in internal RAM 14. When the virtual address PC exists between register values VSI and VEI, that is, when the instruction requested by processing circuit 6 exists in the instruction set residing in RAM 14, internal RAM 14 receives the real address of the instruction from adder circuit 153 and feeds the next instruction to processing circuit 6, as shown in FIG. 4. Meanwhile, if the value of the virtual address PC does not exist between register values VSI and VEI, that is, when the instruction requested by processing circuit 6 does not exist in the instruction set residing in RAM 14, external ROM 9 or 10 receives the real address of the instruction from adder circuit 152, and feds the next instruction to processing apparatus 6, as shown in FIG. 5. Although FIGS. 4 and 5 show memory control for the second layer, the above described operation is similarly carried out for both of the second and third layers.

Although the embodiment shown in FIG. 1 is structured to carry out protocol processings of the second and third layers, it is possible for the communication processor 50 to carry out protocol processings of other layers, when the program stored in ROMs 9 and 10 is replaced by one for other layers at the time of design. In addition, the communication processor 50 may be so structured as to carry out protocol processings of three or more layers.

Internal RAM 14 of the embodiment shown in FIG. 1 may be partially or entirely replaced by an internal ROM. In this case, it is preferable that the most repeatedly used instruction set is stored in internal ROM. Compared with an RAM, a ROM occupies smaller circuit area, and it is inexpensive. Therefore, it contributes to reduction in size of the apparatus and decrease of cost. When internal RAM 14 as a whole is replaced by a ROM and all of the protocol processing programs for the second and third layers are stored in the internal ROM, external ROMs 9 and 10 may be omitted. In this case, communication processor can not be applied to general purposes. However, it is not necessary for memory controller 15 to access instructions externally, and accordingly, speed of accessing the instruction can be improved.

The present invention can be widely applied to network systems employing OSI.

According to the present invention, protocol processings of a plurality of layers can be carried out by one chip communication processor. Therefore, compared with a conventional apparatus in which dedicated processing apparatuses are provided for respective layers, the structure of the whole system can be simplified. In addition, access and transfer of data are done in one chip, and therefore a communication processor capable of high speed accessing and in which data bus is less frequently used can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A one chip communication processor for carrying out protocol processing of a plurality of data protocol layers in a hierarchical network system in which communication functions are provided in a plurality of layers, comprising:

a receiving means for receiving an external communication data signal;

a transmitting means for transmitting data externally of said chip;

a storing means within said chip for storing a plurality of instruction sets necessary for protocol processing of at least two layers; and processing means for executing protocol processing of the at least two layers in accordance with an instruction read from said storing means.

2. The communication processor according to claim 1, wherein
   said storing means stores at least one instruction set which is repeatedly used in a protocol processing program for each layer.

3. A communication processor according to claim 2, further comprising
   memory controlling means for determining whether or not an instruction to be executed by said processing means is stored in said storing means, said memory controlling means reading said instruction by accessing said storing means when it is stored therein, and reading said instruction by accessing an external protocol processing program storing apparatus through said transmitting means, when it is not stored in said storing means.

4. A communication processor according to claim 3, wherein
   said memory controlling means includes
   register means for storing address data indicative of a position of storage of the instruction which is stored in said storing means,
   determining means for comparing address data fed from said processing means with the address data stored in said register means for determining whether or not the instruction to be executed next by said processing means is stored in said storing means, and
   access request generating means responsive to a result of determination by said determining means for generating an access request to said storing means or to the external protocol processing program storing apparatus.

5. A communication processor according to claim 4, wherein
   said register means stores address data of the instruction which is stored in said storing means for only one layer, and
   said processing means changes stored content of said register means every time a layer to be processed is changed, whereby address data of the instruction corresponding to the layer to be processed by said processing means is stored in said register means.

6. A communication processor according to claim 4, wherein
   said storing means includes a random access memory.

7. A communication processor according to claim 1, wherein
   said storing means stores all instructions for the protocol processing programs of at least two layers.

8. A communication processor according to claim 7, wherein
   said storing means includes a read only memory.

* * * * *